Patented May 22, 1923.

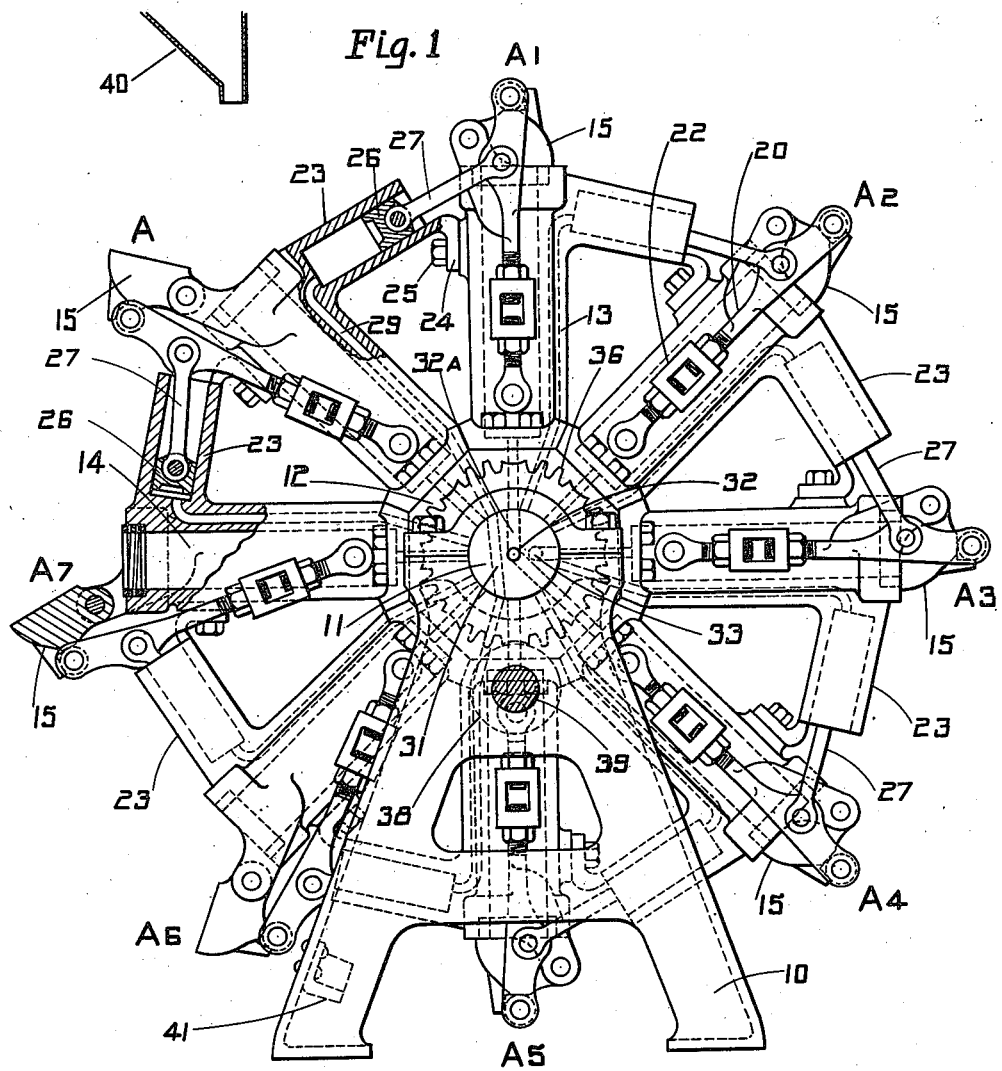

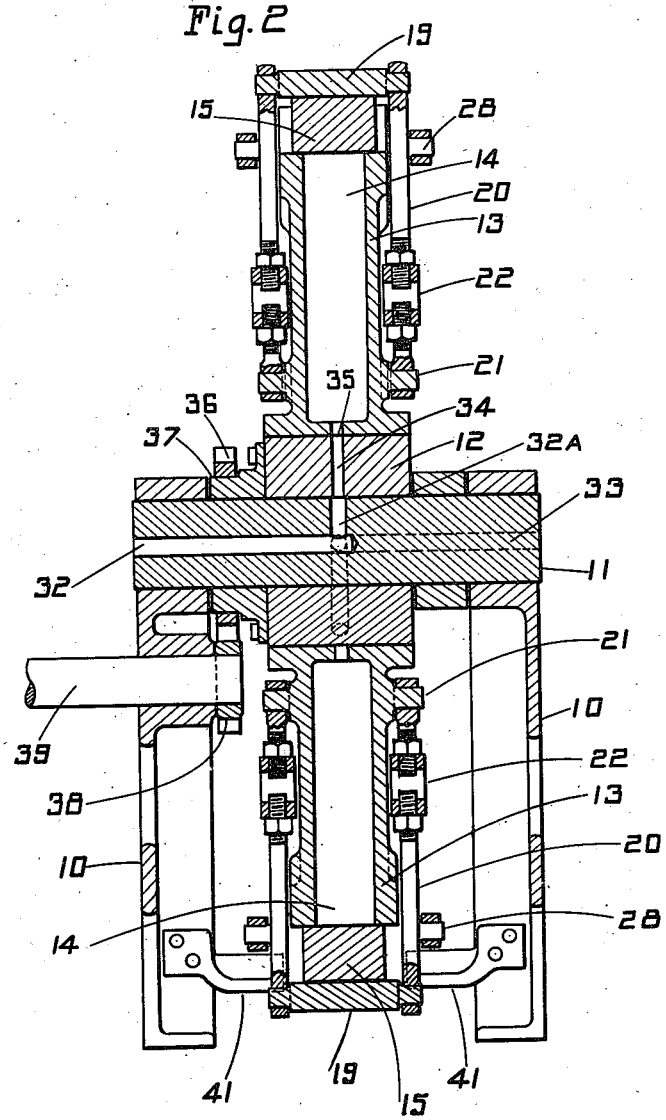

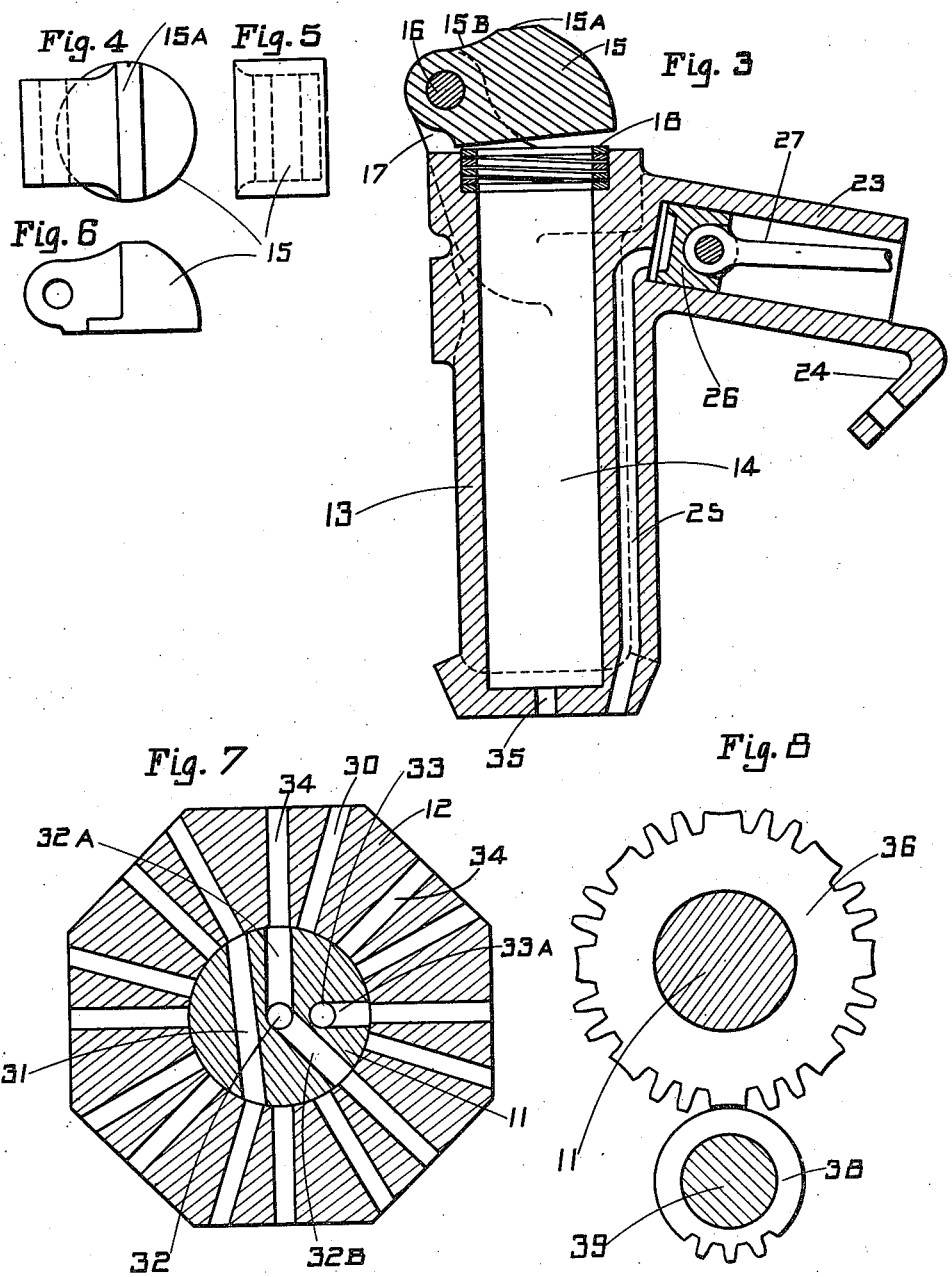

1,455,975

UNITED STATES PATENT OFFICE.

ARTHUR R. SPENCER AND WILLIAM J. PLEWS, OF CLEVELAND, OHIO.

APPARATUS FOR PUFFING OR DISINTEGRATING MATERIAL.

Application filed September 24, 1919, Serial No. 325,923. Renewed October 19, 1922. Serial No. 595,675.

*To all whom it may concern:*

Be it known that we, ARTHUR R. SPENCER and WILLIAM J. PLEWS, the former a citizen of the United States and the latter a subject of the King of Great Britain, and residents, respectively, of Cleveland, in the county of Cuyahoga and State of Ohio, and Cleveland, in the county of Cuyahoga and State of Ohio, have invented a certain new and useful Improvement in Apparatus for Puffing or Disintegrating Material, of which the following is a full, clear, and exact description.

This invention relates to an apparatus for treating materials such as cereals and other cellular or fibrous materials for the purpose of puffing or disintegrating or otherwise treating organic and inorganic materials, such as vegetable, mineral, and animal fibrous materials.

In a companion application filed by us May 26, 1919, Serial No. 300,012, we have disclosed a material treating apparatus for the same general purpose as the machine of the present invention is designed, and composed of a rotary member containing a plurality of treating chambers which, as the member is rotated, are automatically supplied with material to be treated, and are subsequently automatically supplied at least once, and preferably a plurality of times with a treating fluid which may be steam, air or other gas, and finally are automatically opened in such a way as to permit the puffing or disintegrating operation to take place.

In the embodiment of the invention shown in our prior application, the chambers are provided at one end with automatically operated valves by which material is supplied thereto, and at their opposite ends with swinging covers which are released to cause the sudden opening of the chambers for the puffing or disintegrating operation, the member in which the chambers are formed, rotating about a vertical axis, and the chambers themselves being vertically disposed in the member and having the filling valves at their upper ends and the pivoted covers at their lower ends. The admission and exhaust of the treating fluid is accomplished through suitable supply and exhaust passageways extending from the chambers to the vertical shaft around which the chambers rotate and through stationary ports and passageways which are formed in the stationary shaft and with which the first named passageways are designed to be successively brought into registration.

The subject matter of the present invention is a material treating machine or apparatus embodying many of the meritorious features of the machine of our prior application, and more broadly claimed therein, but in this instance constructed and applied in a manner specifically different than disclosed therein.

The object of the present invention is substantially the same as that of our prior invention, to wit, to provide an improvement over the apparatus used heretofore, which secures greater economy of operation and improves the final product delivered by the machine. Further, the invention aims, as is the case with that constituting the subject matter of our prior application, to reduce the time required in puffing or treating the material, to reduce the manual labor, and to provide a small, compact machine which has a large capacity or output, but occupies comparatively little floor space.

The invention may be briefly summarized as consisting in certain novel details of construction and combinations and arrangements of parts which will be described in the specification and set forth in the appended claims.

In the accompanying sheets of drawings, wherein we have illustrated the preferred embodiment of our invention, Fig. 1 is a side view of the machine with parts in section; Fig. 2 is a vertical sectional view through the same; Fig. 3 is an enlarged sectional view of one of the treating chambers with its associated cover, and some other parts; Figs. 4, 5 and 6 are respectively a top plan, an end view, and a side view of one of the covers; Fig. 7 is a sectional view through the supporting shaft and the hub of the rotating member illustrating the ports or passageways formed therein for the purpose of automatically supplying and exhausting treating fluid and for transmitting air from a piston associated with the cover of one chamber which is being opened to a piston associated with a cover of another chamber spaced therefrom and which is being closed; and Fig. 8 is a view showing driving gears which may be employed advantageously to provide a step by step movement.

The machine constituting the subject matter of the present invention includes a stand 10, carrying a stationary horizontal shaft 11, on which is mounted a rotary member composed of a central hub or casting 12, and a plurality of radially disposed members or castings 13, each having a treating chamber 14. The number of treating chambers may be varied as desired, but in this instance they are eight in number, each casting 13 being secured to a flat face of the hub part 12, which in cross section is in this instance octagonal in shape.

Each treating chamber 14 is closed at its inner end with the exception of a port opening to be referred to, and each is provided at its outer end with a cover 15, hinged at 16 to a pair of ears 17, formed on the outer end of the chamber, which cover when closed engages a yieldable seat 18, constructed similar to that shown in our prior application, and composed of an outer ring which is engaged by the inner face of the cover, an inner ring which is secured in the outer part of the chamber, and a metallic spiral connecting member which joins the two rings. This yieldable seat allows for expansion and contraction due to temperature changes without affecting the tightness of the seal formed by the cover. Each cover has at the top a flat seat $15^a$, and next to the seat a curved part $15^b$, the cover being designed to be held closed by a roller 19, mounted in a stirrup composed of a pair of arms 20, which extend inward on opposite sides of the chamber, and at their inner ends are pivotally mounted on studs 21 with which the inner portion of the chamber is provided, each arm having between its ends a turnbuckle 22 which is for the purpose of adjustment.

Between the chambers and near their outer ends are a series of small air cylinders 23, each preferably formed integral with one of the castings 13. Each air cylinder 23 projects outwardly from the casting at nearly but somewhat less than 90° with respect to the axis of the chamber, and the several air cylinders have extensions 24 which when the parts are assembled, abut against the adjoining castings 13 and are bolted thereto as shown at 25, so that the several castings are rigidly bolted together near their outer ends. The air cylinder 23 connected to each casting 13 contains a piston 26 which is connected by links 27 to the side arms 20 of the stirrup carrying the roller which controls the cover of the chamber formed in the adjoining casting, as clearly illustrated in Fig. 1, the outer portions of the arms 20 being provided with studs 28 by which the links 27 are connected thereto.

For the purpose of conveying air to and from the cylinders, and in fact, as will be subsequently explained, for the purpose of permitting the opening movement of one cover and the resulting inward movement of the piston connected thereto, to force air into the cylinder connected to the cover of another chamber in position to be closed, air passages 29 are provided which extend from the inner ends of the air cylinders 23 inwardly along the castings 13 to the hub 12. As will be seen by reference to Figs. 1 and 7, the hub has a series of passageways 30 which constitute extensions of the passageways 29 in the castings 13, these passageways 30 extending from the outer flat faces of the hub inward to the inner surface of the hub which engages the stationary shaft 11. The latter is provided with a chordal passageway 31, which is designed to connect at each one-eighth revolution (since there are eight treating chambers), two of the passageways 30 so as to form an uninterrupted air line from the air cylinder attached to one treating chamber to the air cylinder attached to a treating chamber spaced a given distance therefrom around the machine. As will subsequently appear, this uninterrupted air line is established from the cylinder containing a piston connected to a cover which is thrown open when the chamber is near the bottom of the machine, or in a predetermined position to have the material discharged therefrom and at the same time puffed or disintegrated, to a cylinder containing a piston connected to the cover, in this instance the fourth chamber from that which is being opened, which cover is associated with the chamber which has just been supplied with material and is to be closed so that it may receive the first supply of treating fluid.

The treating fluid, which may be steam, air or other gas at suitable temperature and pressure, such as superheated steam, is automatically supplied to the chambers as the rotary structure is revolved. In this instance each chamber may be supplied twice with the treating fluid as it passes from a given position immediately following the closure of the cover through a portion of a revolution to another position at which the cover is opened, the first injection of the treating fluid being automatically withddrawn. This result is accomplished by supplying and withdrawing the treating fluid through the stationary shaft 11, the latter having an axial passageway 32 which will be connected to a suitable source of treating fluid such as high pressure superheated steam or other fluid, as explained above, and with an exhausting axial passageway 33 which may be connected to a suitable vacuum apparatus. The first-named passageway has two lateral passageways $32^a$ and $32^b$ suitably located and extending outwardly to the surface of the shaft, and the second has a similar lateral extension between the two lateral extensions 32ª and 32ᵇ of the supply passageway. Furthermore, the hub 12 has radially disposed passageways 34, which in this instance extend radially outward from the inner periphery or surface, to the flat surfaces of the hub, and these passageways 34 communicate with the inner ends of the chambers 14, through short passageways 35 formed in the bases or inner ends of the latter.

From this construction it will be obvious that when the different passageways 34 come into registration with the lateral extensions 32ª and 32ᵇ of the supply passageway 32, the treating fluid will be supplied to the corresponding chambers, and when the passageways 34 come into registration with the lateral extension 33ª of the exhaust passageway 33, the treating fluid will be exhausted from the respective chambers.

The above operation or steps of operations may be widely varied by suitably arranging the fluid control passageways in the hub. For example, we may eliminate the withdrawal passageway 33 and provide additional supply branch passageways such as 32ª and 32ᵇ so as to give each chamber a plurality of successive injections of the treating fluid as at each position beginning with position A' until the discharge position A⁶ is reached.

In this instance the rotary structure including the hub and the castings forming the chambers are given a step by step movement, although a continuous movement could be provided. This step by step movement is imparted to the rotary structure by a gear 36, having spaced sets of teeth and secured to a member 37, bolted to one side of the hub 12, and by a pinion 38 secured to a driving shaft 39, which may be driven in any suitable manner, this pinion being toothed for only a portion of its periphery, so that at each revolution it will move the gear 36 through a predetermined part of a revolution, the untoothed portion co-operating in a well known manner with the portions of the gear between the sets of teeth so as to lock the gear against movement between the intervals of the rotary movement imparted by the pinion. Any other suitable driving mechanism may, however, be provided. It might be said that in this instance the rotary structure is moved through one-eighth of a revolution at each step.

The material to be treated is automatically supplied to the treating chambers when they reach filling position, and in this case I have shown conventionally a delivery hopper 40, from which a predetermined amount of the material will be delivered to each chamber when it reaches a position just beneath this hopper. Any suitable valve mechanism may be provided, operated through the rotation of the rotary structure to cause a measured or predetermined amount of material to be discharged into the chamber when it reaches filling position.

After the chamber rotates from filling position through substantially three-fourths of a revolution, during which movement the chamber has received one or more injections of the treating fluid, the cover is released, so that it may be swung open very suddenly by the pressure of the treating fluid within the chamber, and this releasing of the cover is brought about by a pair of trip fingers 41, secured to the lower part of the stand 10, as shown by dotted lines in Fig. 1, and by full lines in Fig. 2. These trip fingers are so positioned that as the chamber moves past them, they engage the arms 20 of the stirrup and stop the movement of the stirrup temporarily, causing the roller at the end of the stirrup to ride off the flat face 15ª of the cover onto the curved portion 15ᵇ. The construction is such that the roller rides off the flat face down onto the curved face, and as the cover is forcibly thrown open to full open position, the roller rides again up the curved face onto the flat face, and as this occurs, the opening movement of the cover is quickly checked without shock. It will be understood that the sudden opening of the cover in this manner causes such a quick expansion of the treating fluid that the material is puffed or disintegrated, depending on the character of the material being treated. As the cover is thrown back carrying with it the stirrup and roller, the piston connected to the stirrup and located in the air cylinder of the chamber next to it is suddenly driven inward, forcing the air from the cylinder through the air line connection established by the passageways 29, 30, and chordal passageway 31 of the shaft into a cylinder containing a piston which is connected to the cover of the chamber just beyond the filling position, with the result that the piston in this last mentioned cylinder is moved outwardly and through the links connecting it to the stirrup of the cover and causes the roller to ride up onto the flat face of the cover and to close the cover and force it down onto the yielding seat.

The operation of the machine is as follows: Assuming that a step by step movement, each consisting of one-eighth of a revolution, is imparted at regular intervals to the rotary structure, and assuming that the axial ducts or passageways in the shaft are connected respectively to the source of treating fluid and to the exhausting apparatus, when the chamber is in position A, the cover is open as shown in Fig. 1, and at this point material to be treated is supplied from the delivery hopper or equivalent device 40, a measured or pre-determined amount being supplied. Then the chamber is moved to the position A', and as it reaches this position the cover is automatically closed through the opening of the cover of another chamber in the discharge position, it being understood that the opening movement of the cover of the chamber from which the material is discharged and the treating fluid is expanded to cause the puffing or disentegration, by its action on the associated piston drives the air through the air passageways already explained to the cylinder containing the piston which is connected to the stirrup having the roller which closes the cover of the chamber when in the position A'. Immediately following the closure of the chamber in the position A' steam or other treating fluid is automatically supplied to the chamber by reason of the fact that the passageways 34, 35, leading from the base of the chamber come into registration with the first fluid supply passageway in the shaft. With the arrangement of ports here shown, the fluid remains in the chamber until the latter passes through position $A^2$ to position $A^3$, whereupon the fluid is exhausted, the object of supplying the first injection of fluid and exhausting it being generally to reduce the moisture content of the material being treated, this being particularly efficacious in the treatment of undesiccated cereals. When the chamber reaches the position $A^4$, it receives a second injection of treating fluid through the receiving passageway coming into registration with the second lateral extension of the fluid supply passageway in the shaft. This treating fluid remains in the chamber while the latter passes through position $A^5$, and when it reaches substantially the position $A^6$, the cover is suddenly thrown open, due to the trip fingers 41 engaging the sides of the stirrup. A very quick opening movement is attained, causing instant expansion of the fluid and the desired treatment of the material, i. e., puffing or disintegration. As before stated, when the cover is thrown open and the chamber reaches this position, through the action of the pistons and air passageways the cover of another chamber in the position A' is closed. The cover remains open while the chamber passes through the position $A^7$, and when it again reaches position A', the chamber receives its second charge of material to be treated, whereupon the operation is repeated. It will be understood that this same operation takes place successively, with all the different chambers.

It will be seen from the above description considered in connection with the drawings, that with this mechanism the several objects stated at the beginning of the specification are attained.

It will be obvious that the construction may be modified in numerous ways, especially in so far as details of construction are concerned, in the number of treating chambers, and also as to the number of treatments to which the material in a chamber is subjected before it is finally discharged. It might be mentioned that in some instances it will not be necessary to supply treating fluid but once to a chamber, in which event the fluid will remain therein until the chamber passes to the position $A^6$. It will also be apparent that the character of the treating fluid will depend upon the material being treated, and its condition, such as the moisture content thereof. We therefore do not desire to be confined to the exact details shown, but aim in our claims to cover all modifications which do not involve a departure from the spirit and scope of our invention in its broadest aspects.

Having described our invention, we claim:

1. In a machine of the character described, a rotary member having a treating chamber substantially radially disposed, with a cover at the outer end of the chamber for opening and closing the latter, and means for supplying a treating fluid under pressure to the chamber.

2. In a machine of the character described, a rotary member having a plurality of substantially radially disposed treating chambers, and means for supplying a treating fluid to the different chambers as the rotary member is moved through its cycle of movement.

3. In a machine of the character described, a rotary member having a treating chamber with a cover at one end, and devices cooperating with the chamber so that as it reaches different positions in its cycle of movement, material to be treated is supplied thereto, the cover is closed, treating fluid is supplied to the chamber, and the cover is opened to permit an expansion of the treating fluid and the discharge of the material from the chamber.

4. In a machine of the character described, a rotary member having a plurality of substantially radially disposed treating chambers, a support on which said member is rotatably mounted, and means for supplying treating fluid to the chambers through said support as the member is rotated.

5. In a machine of the character described, a rotary member having a plurality of substantially radially disposed treating chambers each with a cover at its outer end, a support on which said member is rotatably mounted, and means for supplying treating fluid to the chambers through said support.

6. In a machine of the character described, a rotary member having a plurality of treating chambers projecting outwardly from the center and each having a cover at its outer end, means for supplying a treating fluid to each chamber when it reaches a given position, and means for releasing the cover of each chamber when the chamber reaches another position.

7. In a machine of the character described, a stationary member, a rotary member having a plurality of outwardly projecting treating chambers, means for supplying treating fluid to the chambers as they successively reach a given position, said means comprising a passageway in the stationary member and passageways in the rotary member adapted to be brought into registration with the first named passageway.

8. In a machine of the character described, a stationary member, a rotary member having a plurality of outwardly projecting treating chambers, means for supplying treating fluid to the chambers as they successively reach a given position, said means comprising a passageway in the stationary member and passageways in the rotary member adapted to be brought into registration with the first named passageway, and means for causing the chambers to be opened as they successively reach another position.

9. In a machine of the character described, a member having a plurality of treating chambers each with a movable cover, means for supplying treating fluid to the chambers to treat the material contained therein, means for causing the cover of each chamber to be released for opening, and means for causing the opening movement of the cover of one chamber to close the cover of another chamber.

10. In a machine of the character described, a rotary part having a plurality of treating chambers each with a hinged cover, means for supplying treating fluid to the chambers to treat the material contained therein, means for causing the cover of each chamber to be released for opening when the chamber reaches a given position, and fluid operated means for causing the opening movement of one cover to close another cover.

11. In a machine of the character described, a member having a plurality of treating chambers adapted to be supplied with material to be treated and with a treating fluid, and means for causing the cover of each chamber to be opened when the chamber reaches a given position and the cover of another chamber occupying a predetermined position with the first named at the same time to be closed.

12. In a machine of the character described, a member having a plurality of treating chambers adapted to be supplied with material to be treated and with a treating fluid, and means for causing the cover of each chamber to be opened when the chamber reaches a given position, and the cover of another chamber occupying a predetermined position with the first named at the same time to be closed, said means including fluid cylinders, pistons connected to the covers, and passageways adapted to connect certain of the cylinders.

13. In a machine of the character described, a rotary member having a plurality of treating chambers adapted to be supplied with material to be treated and with a treating fluid, a stationary member supporting the rotary member, and means for causing the cover of each chamber to be opened when the chamber reaches a given position, and the cover of another chamber occupying a predetermined position with the first named at the same time to be closed, said means including air cylinders, pistons connected to the covers, and passageways adapted to connect the cylinders in pairs, said passageways extending part through the rotary member and part through the stationary member.

14. In a material treating machine, a member having a plurality of chambers each having a cover and each adapted to be supplied with material to be treated, and with a treating fluid under pressure, means for holding the covers closed, and means for causing the cover of one chamber to be released for opening movement and for substantially simultaneously causing the closure of the cover of another chamber.

15. In a machine of the character described, a movable member having a plurality of treating chambers, each with a movable closure member, and each adapted to be supplied with material to be treated and with a treating fluid under pressure, and means for causing the closure member of each chamber to be released for opening movement when the chamber reaches a given position, and for substantially simultaneously causing another chamber to be closed.

16. In a machine of the character described, a movable member having a plurality of treating chambers, each with a cover and a movable cover holding member and each adapted to be supplied with material to be treated and with a treating fluid under pressure, means for causing the cover holding member of each chamber to be shifted with respect to the cover thereof when the chamber reaches a given position whereby the cover may be opened by the fluid pressure within the chamber, and means acting simultaneously with the opening of one cover, for causing the cover holding member of the cover associated with another chamber to be shifted so as to tightly close said chamber.

17. In a machine for treating materials by subjecting the materials to fluid under pressure and permitting a sudden expansion of the fluid, said machine comprising a movable member with a plurality of chambers, each with a hinged cover at one end, and with a movable holding member having a part adapted to move over the cover to press the same firmly against the end of the chamber.

18. In a machine for treating materials by subjecting the materials to high fluid pressure and permitting an expansion of the fluid, a movable member having a plurality of chambers each with a hinged cover at one end, and means for securing each cover in place and for permitting the release of the cover, comprising a pivoted stirrup secured to the chamber and provided with a roller adapted to engage over the top of the cover.

19. In a machine of the character described, a rotary member having a plurality of substantially radially disposed treating chambers each provided with a hinged cover at one end, a stirrup pivoted to the body of each chamber and having a part designed to ride over the cover to press the same firmly against a seat at the end of the chamber.

20. In a machine for treating materials, a rotary member having a plurality of substantially radially disposed chambers, each with a hinged cover at one end, means for supplying material to each chamber as it reaches a given position, means for causing the closure of a cover when it reaches another position, means for supplying a treating fluid to the chamber following the closure thereof, and means acting when the chamber reaches another position for causing the cover to be released so that it may be suddenly opened by pressure in the chamber.

21. In a machine for treating materials, a rotary member having a plurality of substantially radially disposed treating chambers, each with a cover at its outer end, devices adapted to engage the covers to hold the same in closed position and permit the opening thereof, and means acting as said member is rotated, and as the chambers reach different positions in the cycle of movement of said member, for causing each chamber to be supplied with a treating fluid one or more times and then to be opened.

In testimony whereof, we hereunto affix our signatures.

ARTHUR R. SPENCER.
WILLIAM J. PLEWS.